March 3, 1931.   G. A. MITCHELL   1,794,726
CAMERA MOUNTING
Filed Dec. 14, 1927   2 Sheets-Sheet 1

Inventor.
George. A. Mitchell.
Attorney.

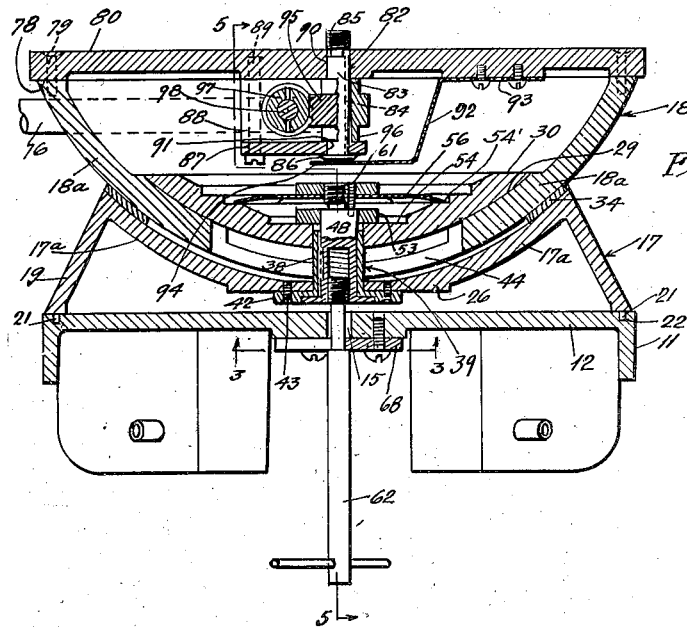

Patented Mar. 3, 1931

1,794,726

UNITED STATES PATENT OFFICE

GEORGE A. MITCHELL, OF LOS ANGELES, CALIFORNIA, ASSIGNOR TO MITCHELL CAMERA CORPORATION, A CORPORATION OF DELAWARE

CAMERA MOUNTING

Application filed December 14, 1927. Serial No. 239,954.

This invention has to do generally with supporting heads or mountings for instruments such as cameras and the like. Since it is particularly well adapted for supporting motion picture cameras when the latter are used in taking panoramic pictures, a condition which involves movement of the camera either or both about a horizontal and a vertical axis, I will describe it as put to this use, though it will be understood this is not limitative but merely illustrative.

The utility of devices thus adapted to allow the camera to "follow" horizontally or vertically progressing action or, by movement, to take in a field of large angle, is well recognized by those skilled in the art. However, there are certain difficulties incident to the provision of a supporting head having these characteristics, and it may be considered as the general object of my invention to provide a device of this nature which overcomes these difficulties in a most simple and effective manner.

The above-mentioned difficulties are inherent to the problem. It is essential to the proper exposure of film within the camera so to steady the movement of the camera that it be not started or stopped abruptly in its traversing movement and to insure that such movement be even at each stage. Now it has been attempted previously to solve the problem by the provision of a universal joint of the ball and socket type wherein spherical faces of opposed joint elements were brought into facial contact. The difficulty with this arrangement has been so to fashion and arrange the various elements that the movement-resisting or steadying force could be properly gaged. Where the faces were brought into such pressural contact that there was an assurance of ample resistance to movement, the tendency was to throw the relatively movable parts into binding engagement, particularly where utmost care had not been used in interfitting the parts. The cost of fashioning the parts so there was no binding tendency, was practically prohibitive. On the other hand, an attempt to decrease the pressural contact so there was no tendency to bind, usually resulted in such a diminution of pressural contact that the retarding means would not function as intended or else too much play developed between the relatively movable parts. In other words, the adjustment necessary to secure exactly the correct degree and nature of pressural contact was almost impossible of accomplishment, particularly in view of the fact that re-adjustment was constantly necessary in order to compensate for normal or abnormal wear.

I have overcome these difficulties in such a manner that the cost of manufacturing the device is held to a minimum, there being no complications of machining and assembly involved, and yet the effectiveness of the device and its ability to stand up under relatively severe service conditions have been fully proved by extended use in the field. However, the manner in which I accomplish the above can be discussed to better advantage in the following detailed description.

I have also provided novel means for adjusting the joint elements to give variable resistance to traversing movement of the camera, and though this means is completely housed and thus protected, it is adapted to be actuated from without the housing. It is also highly desirable that the joint be bodily movable into and out of connection with respect to the supporting tripod head, and as a special feature of the device I have provided a single member which is adapted to be actuated both to connect the joint detachably to the tripod head and also to control the clamping member whereby the joint is adjusted.

I have also devised novel means for detachably connecting a camera or the like to the joint, but this, together with other novel features and objects of the invention will be set forth in connection with the following detailed description, reference being had to the accompanying drawings, in which:

Fig. 2 is an enlarged medial section through the mounting;

Fig. 3 is a fragmentary section on line 3—3 of Fig. 2;

Fig. 4 is a fragmentary detail similar to a part of Fig. 2, but showing the connector in changed position;

Fig. 7 is a view similar to Fig. 6 but showing the ball as applied to the cup member and showing the clamping head in place;

Fig. 8 is a detail, sectional view of a bushing used in connection with the cup member; and Fig. 9 is a detached elevation, partly in section, of the clamp spindle.

Figure 1:
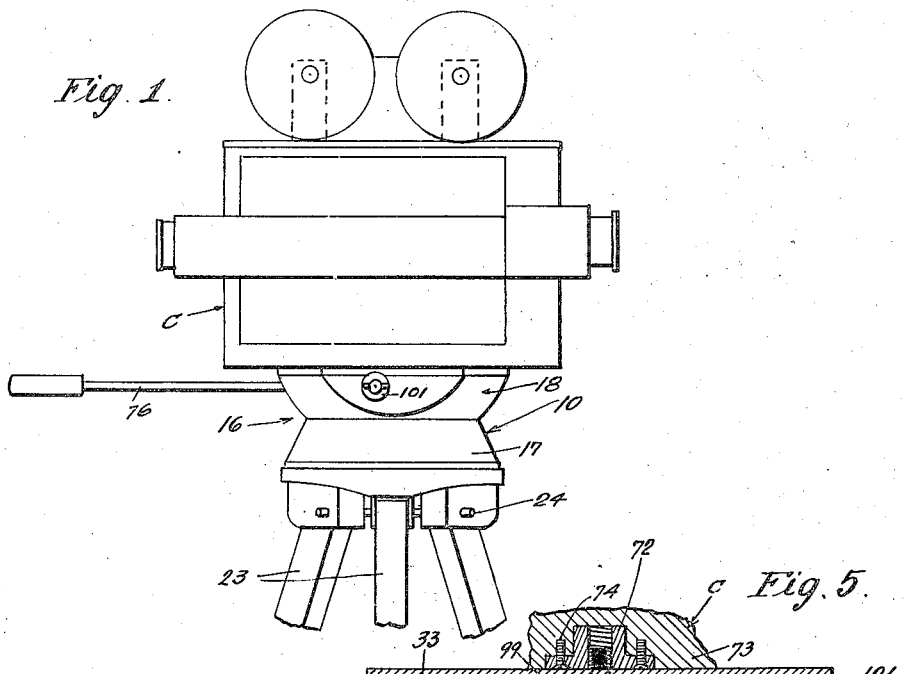
Fig. 1 is a side elevation of a device embodying my invention, showing a camera applied thereto.

My improved mounting is generally indicated at 10, and while for certain purposes the tripod head or platform 11 may be considered as a part of this mounting, it will be understood that the joint elements may be applied with equal advantage to tripod heads having characteristics other than those illustrated. Head 11 consists of a circular plate 12 having a peripheral flange 13 and a central, depending boss 14 having an axial, vertical bore 15. The joint generally indicated at 16 includes a base or cup member 17 and a ball member 18. Cup member 17 has an upper wall 17a which is preferably, though not necessarily, concavo-convex, a conical flange 19 extending marginally from this wall and its lower edge 20 being adapted to seat on the upper face of plate 12. There are positioning pins 21 on edge 20 which are adapted to enter sockets 22 in plate 12 to hold member 17 in axial alinement with the tripod platform which, in turn, is supported by legs 23 through usual pivotal connections 24. The means for holding cup member 17 and, through it, for holding the entire joint 16 from separative movement from plate 12 in the direction of their common axis, will be described at a later point in the specification.

Now it is not essential that under-face 25 of wall 17a be convex, but it is preferably due to the fact that it keeps the weight of the element down to a minimum. Said underface preferably has a central boss 26, the lower face of which is preferably somewhat higher than flange edge 20, it following that appreciable vertical clearance is provided between the top of plate 12 and the underside of the boss to accommodate certain elements and relative movements to be hereinafter described.

Ball element 18 is preferably segmental in character and its wall 18a may be generally described as concavo-convex, the outer spherical surface 28 thereof being a bearing surface adapted to engage member 17, and the inner concentric face 29, which preferably is in the form of an annulus, serving as a bearing face for a clamp element such as the complementary segmental washer 30 which has the spherical face 31 in engagement therewith. Member 18 preferably has parallel, chordal flanges 32 which, with the spherical portions of the ball member, form the sides and bottom of housing H which may be considered as defining the ball hollow or compartment 33.

Now member 18 is to have complementary spherical bearing with member 17, but it is not necessary that they be in full facial engagement when the joint elements are coaxial. For instance, the bearing face of socket member 17 may be in the nature of an annulus 34, presenting the annular, spherical bearing face 35 adjacent flange 19. The remaining extent 36 of the upper face of wall 17a may be considered as depressed, there thus being formed a clearance space or chamber 37 between members 17 and 18 within annulus 34. This provision of limited bearing face on the socket member reduces the extent of necessarily accurate machining and the depressed portion 36 leaves the compartment 37 capable of taking a body of material having relatively high degrees of viscosity and adhesiveness, which material may work between the bearing faces 35 and 28, and, being compressed therebetween by a means to be described, insures smoothness and steadiness of movement of the ball member with respect to the cup member. This viscose material also tends to resist yieldingly the ball-movement impelling force and prevents vibrations arising from uneven movement or too sudden starting up or reversal of the direction of movement.

Preferably, though not necessarily, annulus 34 is of a material having characteristics different from that of the ball member. For instance, while the ball member may be of steel, the annulus may be of leather. By reason of its nature, the annulus then prevents the "freezing" together of the ball and socket elements, has a slight degree of resiliency so that nicer adjustments of the clamping mechanism may be had without causing binding coaction between the ball and socket members, provides a face which is soft enough to accommodate any inaccuracies in the metal ball member though firm enough to prevent "sloppy" movement, and is adapted more or less to take up the viscose material and retain it between the bearing faces.

Figure 6:
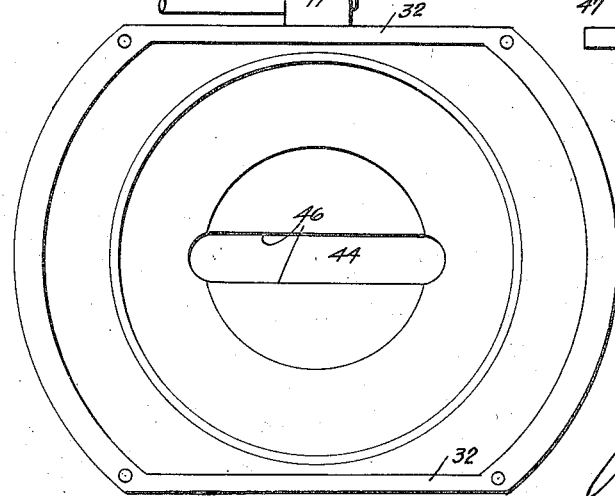
Fig. 6 is a top plan view of the ball element of the joint, all overlying parts being omitted.

Extending axially through boss 26 is the stem portion 38 of the flanged bushing 39, said bushing having a bore 40 and a counterbore 41. The bushing flange 42 underlies boss 26 and is held firmly thereto by screws 43. Stem 38 is thus in the nature of a tubular post extending radially (in the illustrated form, vertically and axially) through wall 17a to a point well above face 36. The concavo-convex wall 18a of ball 18 has an elongated slot 44 (Fig. 6) which extends through and from side to side of the center thereof, said slot normally being substantially parallel to chordal flanges 32. Post or stem 38 is taken nicely within this slot or way 44, and it will be seen that the post with the side defining walls 46 of the way serve as means for preventing the relative movement of the ball and socket members or joint members in one direction. Thus it will be seen that the ball member 18 may be rotated about the vertical axis of the mounting without limitation and that it may be rotated about a horizontal axis through vertical axial planes of the mounting but that the coaction of the post with the way-walls maintains the vertical plane of the ball member in the vertical axial planes of the socket member during the above movements.

Without regard to the method of connection or the method of clamping the joint elements together, it may be here stated that the camera C is adapted to be detachably fixed to the ball member, and it will be seen that due to the nature of the ball and socket joint described above, this camera may be rotated about its vertical axis and may be rotated about a horizontal axis through vertical axial planes, but is maintained erect during all such movements. In other words, the camera is rotatable about the vertical axis of the joint or of itself, and it may be tilted endwise about a horizontal axis, but it is positively held from tipping sidewise. The advantages of this arrangement are obvious.

I will now describe the means for holding the joint elements together and for adjusting these means to give variable but even clamping actions so the resistance to joint movement may be varied to suit individual requirements or tests. It will be recognized that while it is not limitative on the invention, the illustrated showing of common means for holding the joint elements in assembly and for clamping them together with variable pressure is an obvious advantage, note being here made that the holding and clamping means is entirely self-contained within the joint elements, so the joint, as a whole, may be connected to or disconnected from the camera or the tripod; it being made apparent later that as a further feature the means which are adapted to be actuated to vary the clamping action is also adapted to actuate the means holding the joint, as a whole, to the tripod head.

It will be seen that segmental washer 30 with segmental annulus 34 define a segmental way W through which the wall 18a of the ball member is adapted to move, the washer being in full facial engagement with the ball member. Means are then provided for drawing the washer toward wall 18a to clamp the wall 17a with varying degrees of pressure between the washer and the socket member to vary the resistance to such movement of the ball, the arrangement being such that under certain circumstances the pressure may be made sufficiently great to hold the ball frictionally against movement in any direction.

While I have shown this washer 30 as the member which is in direct facial contact with the ball member and have shown pressure applying means acting on this washer with variable pressure to secure the clamping action on the ball, it will be apparent that such application need not be made through an intermediate member, since it is only necessary to hold the ball in comparatively firm engagement with the socket member which is then fully competent to guide the ball member in its movement. Therefore, such of my claims as do not include the segmental washer but do specify the necessary elements of the clamping mechanism are drawn to fully operable assemblies. However, in order to insure smooth working the washer is utilized, and my preferred embodiment includes it.

The post or tubular stem portion 38 of bushing 39 extends vertically above face 29 of wall 17a and fits the axial bore 47 of washer 30, the washer thus being centered with respect to the segmental spherical socket in member 17. Preferably there is a film of viscose material between faces 29 and 31 which material has the same function as that interposed between faces 28 and 35. Under certain conditions, washer 30 is capable of axial rotation.

A clamping spindle 48 is shown in detail in Fig. 9. This spindle includes the cylindrical body portion 49 having at one end a reduced threaded portion or head 50 and at the other end a head flange 51. Body portion 49 is adapted to be taken with sliding fit within the bore 40 of bushing 39, there being a key connection 52 (Fig. 2) which allows vertical longitudinal movement of the spindle through the bushing, but prevents relative rotation thereof. Head 51 is normally adapted to be taken within counterbore 41 while body portion 49 extends beyond the upper end of the bushing and above the inner face of washer 30, there preferably being a relatively small washer 53 about the upper end of body portion 49 and resting on the flat face 54 of washer 30. As is evident from Fig. 5, the inner face of washer 30 is preferably stepped to provide a plurality of annular flat faces 54, 54' and 55.

Mounted on head 50, though it may be relatively rotatable with respect thereto, is a resilient clamping head 56 which is preferably in the nature of a spider (Fig. 7) made of spring steel, whose arms 57 terminate in segmental heads 58 which engage annular face 54' of washer 30. A nut 59 is threaded on head 50 over the spider 56, the nut having sockets 60 to receive the studs of a spanner wrench or the like.

Arms 57 are preferably bowed as shown in

Figure 5:
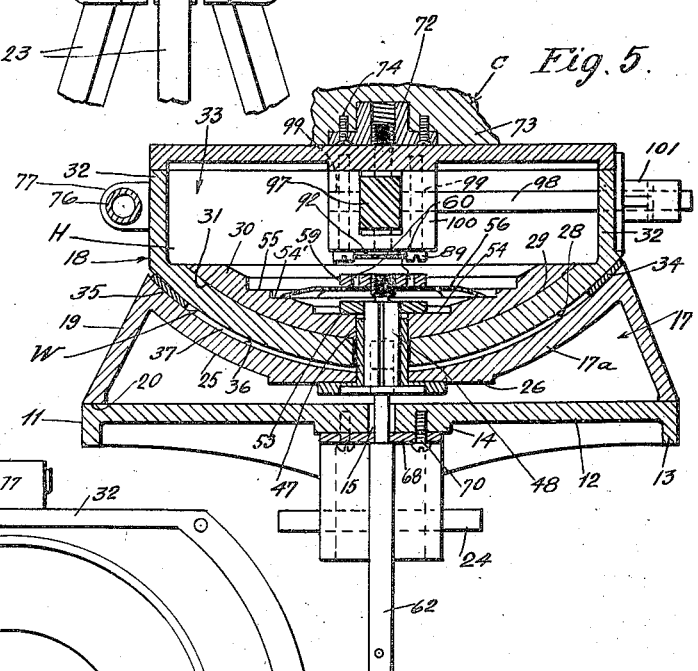
Fig. 5 is a section on the broken line 5—5 of Fig. 2.

Figs. 2 and 5, and it will be seen that when nut 59 is threaded down, with head 51 fully entered in counterbore 41, the spring arms 57 exert downbearing pressure on washer 30, and the ball member is thus pressed between said washer and wall 17a. Initially, nut 59 is threaded down until it springs spider 56 just sufficiently to hold the ball member clamped against loose movement, and then a set screw 61 is threaded between head 50 and the nut to act as a key to prevent subsequent relative rotation thereof, thus serving to hold the clamping assembly in adjusted condition. It will be seen that the clamping assembly above described, serves as a means for holding the joint members in assembly whether or not said assembly is attached to the tripod head, and it will be evident that means actuated to draw spindle 48 downwardly will act on spider 56 to exert greater pressural force on washer 30 and thereby clamp the ball member of the joint in a manner to offer greater resistance to movement thereof.

It will also be seen that when the joint is applied to the tripod head this clamping assembly is entirely housed, and therefore that means must be provided whereby said clamp may be actuated from the exterior of the housing. Though this is not limitative on the invention, I have provided unitary means adapted to be actuated both to operate or adjust the clamping mechanism and to hold the joint, as a whole, to the tripod head. This means includes a vertically arranged bolt or shaft 62 having a handle bar 63 at one end, and a threaded head 64 at the other end, there being a portion or neck 65 of reduced diameter adjacent head 64. There are thus provided the opposed annular shoulders 66 and 67 which are spaced longitudinally along shaft 62. A keeper 68 is provided in the form of a disk having a radial slot 69 which is of a width to take neck 65, though it will not pass head 64 nor the body portion of the shaft. Disk 68 is secured by screws 70 to the underside of boss 14, the arcuate end 71 of slot 69 being in axial alinement with aperture 15. This aperture is of a diameter to take head 64, with clearance, said head having, preferably, the characteristics of standard attachment bolts whereby it is adapted to coact with standard sockets provided on the bottom of cameras so, in the event it is desired to mount such a camera directly on head 11, such attachment may be made through member 62. In Fig. 5 I have shown such a standard socket 72 secured to the bottom 73 of camera C by screws 74, though in this figure the camera is applied to the joint 16 rather than to head 11.

The bore 15 in boss 14 is of a size to take head 64 when shaft 62 is in the position of Fig. 4, that is, when joint 16 is not attached to member 11, keeper 68 engaging the head shoulder 66 to hold member 62 from dropping clear of plate 12. It is obvious that member 62 is movable vertically in the direction of its axis and with respect to plate 12, the extent of movement being limited by engagement of keeper 68 with shoulders 66, 67, the shaft 62 and head 64 remaining in axial alinement with clamping spindle 48 throughout this vertical movement, assuming that the positioning pins 21 on flange 19 are entered in sockets 22.

Spindle 48 has an axial, threaded socket 75 which opens to the lower face of head flange 51 and hence is in axial alinement with threaded head 64. Assuming that member 62 be in the position of Fig. 4, that joint 16 has been placed upon plate 12 with pins 21 entered in sockets 22, and that it be desired, to hold the joint to the tripod head, shaft 62 is merely lifted until head 64 engages spindle 48, and subsequent rotation of member 62 screws said head into bore 75, thus effecting a connection between the spindle and actuating member 62. As soon as shoulder 67 engages the under face of keeper plate 68, it will be seen that spider 56 acts through washer 30 and wall 18 to hold member 17, and hence the entire joint 16, to member 11, thus preventing subsequent separative movement of the tripod head and joint in the direction of their common axis.

Should the frictional resistance offered to the movement of wall 18 through way W, not be sufficient for a given situation, the operator merely has to rotate member 62 to screw head 64 further into the bore 75 of spindle 48, but since, during this subsequent rotation of member 62 further upward movement of said member is prevented by keeper 68, the threaded engagement of the head with the spindle necessarily results in said spindle being drawn downwardly, that is, it sets up longitudinal movement of said spindle both with respect to shaft 62 and bushing 39. This movement carries nut 59 downwardly and spider 56 therefore presses with greater effective force upon washer 30 and thus more tightly clamps ball member 18 to the socket member.

Thus, actuation of member 62 may serve to adjust the clamping means to give any desired resistance to movement of the ball member, within reasonable limits, and if occasion arises for holding the ball member against movement with respect to the socket member, this may be accomplished by exerting sufficient down-bearing force on spider 56.

While it is not ordinarily necessary to provide a positive stop for downward movement of spindle 48, it will be seen that such downward movement may be limited either by engagement of the underside of head 51 with the upper face of plate 12 or engagement of the lower face of spider 56 with the upper face of the small washer 53. With the clamp loosened sufficiently to allow movement of the ball member with respect to the socket member, said ball member may be shifted through a controlling handle 76 which is applied to the boss 77 provided on ball member 18, preferably to the outer face of one of the chordal flanges 32.

It will be seen that spindle 48 and connector 62 may be considered together as a two-part shaft, one part being carried by the joint and the other part being carried by the tripod head, said parts being adapted to be moved into connection when the joint is assembled with the tripod head, and the connector being adapted to be actuated to hold the joint, considered as a whole, to the tripod head, and also to adjust the clamping mechanism to vary the degree of restraint offered to movement of the joint elements with respect to one another.

We thus have the following conditions existing. The clamp mechanism which is adapted to be actuated to vary the restraint offered to joint movement is also depended upon for holding the joint elements against separation when the joint is detached from the tripod head. Accordingly, the clamp elements remain in holding condition whether or not the joint is applied to the tripod. In order that the clamp may be adjustable there are necessarily relatively movable parts incorporated therein, and since these parts are entirely housed when the joint is applied to the head means are provided which are adapted to be actuated from outside the housing, and I have provided this means in such form that it is also adapted to be actuated to tie the joint, as a whole, detachably to the tripod head, the provision of this unitary actuating member for actuating both the tieing and clamp-adjusting means being a feature of obvious advantage.

Applied to the upper, marginal edge 78 of ball member 18, by such means as screws 79, is a camera-supporting platform 80, which completes the housing H by defining the top of compartment 33 within which washer 30 and the upper parts of the clamping mechanism lie. While any suitable means may be employed for connecting camera C detachably to platform 80, I have shown and will describe a preferred means, which has inherent and obvious advantages. Thus, I provide an attachment screw 82 which includes a cylindrical body portion 83 having a key-way 84 cut longtiudinally therein, a threaded head 85 which is preferably similar in character to head 64, and an enlargement or head 86 at its lower end. When the screw 82 is in the position of Fig. 2, it has rotational bearing in platform 80 and the bottom wall 87 of the bracket 88 which is fixed to the under face of platform 80 by screws 89. The screw is adapted to move limitatively longitudinally through the apertures 90 and 91 in platform 80 and wall 87, respectively, a spring 92 being secured at one end 93 to the platform and having its free terminal 94 engaging the under face of screw-head 86 to hold said screw normally at the upper limit of its longitudinal travel as determined by the contact of head 86 with wall 87 and as shown in Fig. 2. Screw 82 is preferably, though not necessarily, in axial alinement with spindle 48.

A spiral gear 95 is keyed to screw 82 to prevent relative rotation therebetween, though the screw is capable of longitudinal movement through the bore of the gear. The gear is held against movement in the direction of its axis by the engagement of the end faces of its hubs 96 with the lower and upper faces of platform 80 and wall 87, respectively.

Gear 95 meshes with a gear 97 pinned to a shaft 98 journaled at 99 in the side walls 100 of bracket 88 and extending through one of the chordal flanges 32, preferably, the one opposite that to which handle 76 is applied. An actuating knob 101 is pinned to shaft 98 exteriorly of the ball member, and it will be seen that rotation of this knob acts through shaft 98 and gears 97, 95 to rotate screw 82 either prior to or during longitudinal movement of said screw.

Assuming that it be desired to attach the camera C to the platform, the said camera is merely placed with its base 73 upon the platform, with socket 72 in axial alinement with screw 82. The camera, of course, depresses or moves this screw longitudinally against the action of spring 92 to bring the upper end of said screw flush with the upper face of platform 80. By then rotating knob 101, screw 82 is moved into threaded connection with the socket 72 and the camera drawn firmly against the platform, it being recognized that spring 92 acts yieldably to press the screw longitudinally into engagement with the socket so that initial rotation of said screw properly engages the screw and socket threads.

With the camera thus applied to the head, it will be seen that movement of handle 76 is adapted to swing the camera either or both about its vertical axis and about a horizontal axis which is located at the center of curvature of face 35, but that during such movement the camera is maintained in erect condition, that is, it is held against tipping sidewise, this restraint against side-tipping movement being accomplished through the engagement of way walls 46 with post or bushing 38.

It will be seen that while I have provided a thoroughly efficient structure which is adapted to function as well as or better than the relatively complicated devices on the market, the structure is exceedingly simple in nature, which is advantageous both from

I claim:

1. A camera mounting embodying a stationary friction plate, a camera carrying plate movable on said friction plate, a clamping spindle extending vertically through apertures provided through said friction and camera carrying plates, said spindle being movable vertically but not rotatably with reference to said plates, a spring carried by the upper end of the spindle and adapted to cause yielding pressural engagement of the camera carrying and friction plates, and means to limit upward movement of the spindle with reference to the friction plate, there being a screw threaded socket in the lower end of the spindle to take a hold down bolt.

2. In combination, a tripod plate, a joint adapted to be removably held to the plate, said joint including a stationary friction plate, a camera carrying plate movable on said friction plate, a clamping spindle extending vertically through apertures provided through said friction and camera carrying plates, said spindle being movable vertically but not rotatably with reference to said plates, a spring carried by the upper end of the spindle and adapted to cause yielding pressural engagement of the camera carrying and friction plates, means to limit upward movement of the spindle with reference to the friction plate, and a hold down bolt carried by the tripod plate and adapted to be screwed into a socket provided in the lower end of the spindle to connect the joint to the plate, and then to be operated to draw said spindle downwardly with reference to the friction and camera carrying plates for adjustment of the yielding pressural engagement therebetween.

3. A camera mounting embodying a pair of vertically spaced friction plates presenting a pair of opposed bearing faces, a camera carrying plate confined therebetween and having a pair of faces slidably engaging the bearing faces of the friction plates, a tubular post extending upwardly through apertures provided through the plates and into the upper friction plate, a clamping spindle longitudinally movable but non-rotatable in the bore of said post, a spring carried by the upper end of the spindle yieldingly engaging the upper friction plate, and means to limit upward movement of the spindle with reference to the lower friction plate, there being a screw threaded socket in the lower end of the spindle to take a hold down bolt.

4. In combination, a tripod plate, a joint adapted to be removably held to the plate, said joint including a pair of vertically spaced friction plates presenting a pair of opposed bearing faces, a camera carrying plate confined therebetween and having a pair of faces slidably engaging the bearing faces of the friction plates, a tubular post extending upwardly through apertures provided through the plates and into the upper friction plate, a clamping spindle longitudinally movable but non-rotatable in the bore of said post, a spring carried by the upper end of the spindle yieldingly engaging the upper friction plate, means to limit upward movement of the spindle with reference to the lower friction plate, and a hold down bolt carried by the tripod plate and adapted to be screwed into a socket provided in the lower end of the spindle to connect the joint to the plate, and then to be operated to draw said spindle downwardly with reference to the plates for adjustment of the yielding pressural engagement therebetween.

5. A camera mounting embodying a stationary friction plate, a camera carrying plate movable on said friction plate, a clamping spindle extending vertically through apertures provided through said friction and camera carrying plates, said spindle being movable vertically but not rotatably with reference to said plates, a spring carried by the upper end of the spindle and adapted to cause yielding pressural engagement of the camera carrying and friction plates, an adjusting nut screw threaded on the upper end of the spindle and bearing downwardly on said spring for regulation of the pressure exerted thereby, and means to limit upward movement of the spindle with reference to the friction plate, there being a screw threaded socket in the lower end of the spindle to take a hold down bolt.

6. In combination, a tripod plate, a joint adapted to be removably held to the plate, said joint including a stationary friction plate, a camera carrying plate movable on said friction plate, a clamping spindle extending vertically through apertures provided through said friction and camera carrying plates, said spindle being movable vertically but not rotatably with reference to said plates, a spring carried by the upper end of the spindle and adapted to cause yielding pressural engagement of the camera carrying and friction plates, an adjusting nut screw threaded on the upper end of the spindle and bearing downwardly on said spring for regulation of the pressure exerted thereby, means to limit upward movement of the spindle with reference to the friction plate, and a hold down bolt carried by the tripod plate and adapted to be screwed into a socket provided in the lower end of the spindle to connect the joint to the plate, and then to be operated to draw said spindle downwardly with reference to the friction and camera carrying plates for adjustment of the yielding pressural engagement therebetween.

In witness that I claim the foregoing I have hereunto subscribed my name this 10th day of November, 1927.

GEORGE A. MITCHELL.